United States Patent
Hirohata

(10) Patent No.: US 11,762,074 B2
(45) Date of Patent: Sep. 19, 2023

(54) POSITION CALIBRATION METHOD FOR INFRASTRUCTURE SENSOR APPARATUS, INFRASTRUCTURE SENSOR APPARATUS, A NON-TRANSITORY COMPUTER READABLE MEDIUM STORING INFRASTRUCTURE SENSOR SYSTEM, AND POSITION CALIBRATION PROGRAM

(71) Applicant: Toyota Jidosha Kabushiki Kaisha, Toyota (JP)

(72) Inventor: Mikikane Hirohata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 164 days.

(21) Appl. No.: 17/408,903

(22) Filed: Aug. 23, 2021

(65) Prior Publication Data

US 2022/0066051 A1    Mar. 3, 2022

(30) Foreign Application Priority Data

Aug. 27, 2020 (JP) .................................. 2020-143585

(51) Int. Cl.
    *G01S 13/06* (2006.01)
    *G01S 7/40* (2006.01)

(52) U.S. Cl.
    CPC ............ *G01S 13/06* (2013.01); *G01S 7/40* (2013.01)

(58) Field of Classification Search
    CPC ......... G01S 19/26; G01S 19/48; G01D 18/00; G01C 21/28
See application file for complete search history.

(56) References Cited

U.S. PATENT DOCUMENTS

| | | | |
|---|---|---|---|
| 2007/0252758 A1* | 11/2007 | Loomis ................. | G01S 19/235 342/464 |
| 2018/0023960 A1* | 1/2018 | Fridman .............. | G05D 1/0251 382/104 |
| 2018/0059680 A1* | 3/2018 | Tateishi ................ | G01S 17/931 |

(Continued)

FOREIGN PATENT DOCUMENTS

JP      2010-127650 A     6/2010

*Primary Examiner* — Timothy A Brainard
*Assistant Examiner* — Kenneth W Good
(74) *Attorney, Agent, or Firm* — Dinsmore & Shohl LLP

(57) ABSTRACT

A position calibration method including, moving body information including first global estimated position information indicating global position information recognized as a geographic position of the moving body, the method including: extracting local estimated position information indicating a position of the moving body within the detection target region from information acquired by the sensor unit; calculating second global estimated position information estimated as the geographic position of the moving body based on the local estimated position information; and performing calibration of third global estimated position information held as a geographic position of the sensor unit when a determination value obtained from the difference between the first global estimated position information and the second global estimated position information exceeds a preset threshold value and based on a result of calibration processing in which a difference between the first global estimated position information and the third global estimated position information is reduced.

5 Claims, 7 Drawing Sheets

(56) References Cited

U.S. PATENT DOCUMENTS

| | | |
|---|---|---|
| 2019/0107399 A1* | 4/2019 | Kawauchi ................ G08G 1/09 |
| 2020/0003897 A1* | 1/2020 | Shroff ................... G01S 17/931 |
| 2020/0111011 A1* | 4/2020 | Viswanathan ......... G06N 20/10 |
| 2020/0111358 A1 | 4/2020 | Parchami et al. |
| 2020/0264275 A1 | 8/2020 | Voorheis et al. |
| 2021/0005085 A1* | 1/2021 | Cheng .................. G08G 1/0141 |
| 2021/0063546 A1* | 3/2021 | Slobodyanyuk ........ G01S 17/86 |
| 2021/0074151 A1* | 3/2021 | Stählin .................... G08G 1/04 |
| 2021/0141100 A1* | 5/2021 | Castorena Martinez .................... G01S 5/0072 |
| 2022/0155448 A1* | 5/2022 | Adachi .................. G01S 17/06 |
| 2022/0214173 A1* | 7/2022 | Nojiri .................. G01C 21/165 |

\* cited by examiner

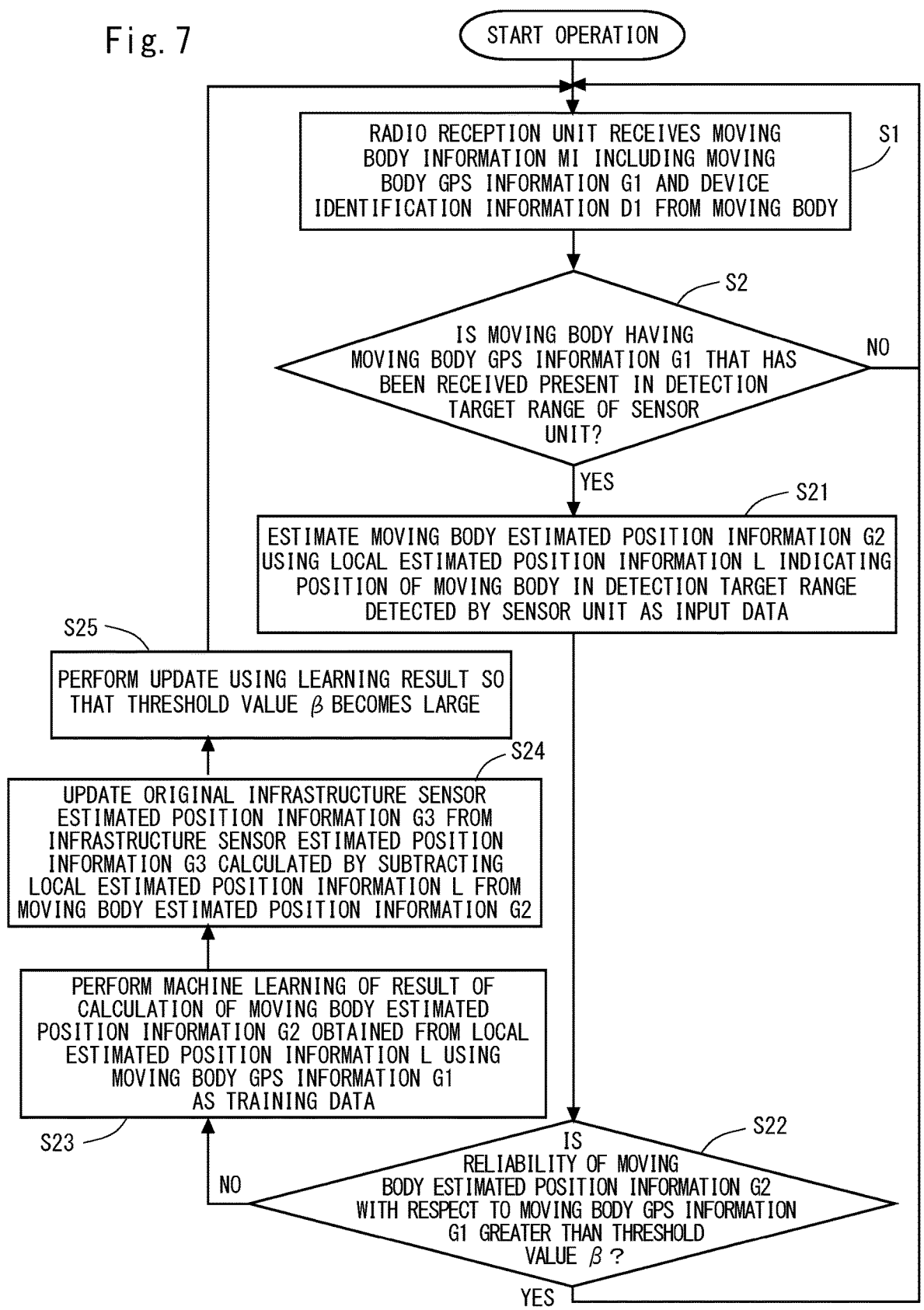

POSITION CALIBRATION METHOD FOR INFRASTRUCTURE SENSOR APPARATUS, INFRASTRUCTURE SENSOR APPARATUS, A NON-TRANSITORY COMPUTER READABLE MEDIUM STORING INFRASTRUCTURE SENSOR SYSTEM, AND POSITION CALIBRATION PROGRAM

CROSS REFERENCE TO RELATED APPLICATIONS

This application is based upon and claims the benefit of priority from Japanese patent application No. 2020-143585, filed on Aug. 27, 2020, the disclosure of which is incorporated herein in its entirety by reference.

BACKGROUND

The present disclosure relates to a position calibration method for an infrastructure sensor apparatus, an infrastructure sensor apparatus, an infrastructure sensor system, and a position calibration program such as a position calibration method for an infrastructure sensor apparatus that detects a moving body traveling on a road, an infrastructure sensor apparatus, an infrastructure sensor system, and a position calibration program.

In recent years, there has been developed a traffic system in which the traffic status or the like is grasped, and a moving body that is moving on a road is notified about various kinds of information or various controls for relieving the traffic congestion are performed on the moving body that is moving on the road. In such traffic system, an infrastructure sensor in used for grasping the traffic status. The infrastructure sensor detects a moving body within a detection target range using an optical camera, a millimeter wave radar, a LiDAR (Laser Imaging Detection and Ranging), or the like. The traffic system performs control based on information on the moving body collected using the infrastructure sensor. At this time, in order to grasp the position of the moving body, the host system needs to accurately grasp the position of the infrastructure sensor. Therefore, Japanese Unexamined Patent Application Publication No. 2010-127650 discloses a technique of performing automatic calibration of position information of an installed sensor such as an infrastructure sensor.

Japanese Unexamined Patent Application Publication No. 2010-127650 discloses a system for estimating a position of a moving body that moves within a measurement range in which: a plurality of moving bodies are distributedly arranged within a measurement region and the distances among the moving bodies are measured using three or more distance sensors; a sensor measurement value at any given time is acquired from each distance sensor and stored in a position estimation calculation apparatus; a distance reliability indicating a degree of reliability according to a distance is provided to a sensor measurement value of each distance sensor acquired and stored; the position of each distance sensor and each moving body is estimated by using the highly reliable measurement value among the sensor measurement values acquired and stored; and in position estimation processing, the position of each distance sensor and the moving position of each moving body are estimated by referring to the sensor measurement values acquired from each of the two or more distance sensors disposed at positions ahead of the moving body and behind the moving body.

SUMMARY

However, the technique disclosed in Japanese Unexamined Patent Application Publication No. 2010-127650 has a problem in that a plurality of distance sensors have to be disposed in a distributed manner within a measurement range.

The present disclosure has been made in view of solving the problem mentioned above and an object of the present disclosure is to facilitate calibration of installation position information of an infrastructure sensor apparatus.

An aspect of a position calibration method for an infrastructure sensor apparatus according to the present disclosure is a position calibration method for an infrastructure sensor apparatus that includes:
  a sensor unit configured to detect a moving body within a detection target region; and
  a radio reception unit configured to perform communication with the moving body and receive, from the moving body, moving body information including first global estimated position information indicating global position information recognized as a geographic position of the moving body,
the method including:
  extracting local estimated position information indicating a position of the moving body within the detection target region from information acquired by the sensor unit;
  calculating second global estimated position information estimated as the geographic position of the moving body based on the local estimated position information; and
  performing calibration of third global estimated position information held as a geographic position of the sensor unit when a determination value obtained from the difference between the first global estimated position information and the second global estimated position information exceeds a preset threshold value and based on a result of calibration processing in which a difference between the first global estimated position information and the third global estimated position information is reduced.

An aspect of an infrastructure sensor apparatus according to the present disclosure is an infrastructure sensor apparatus including:
  a sensor unit configured to detect a moving body within a detection target region;
  a radio reception unit configured to perform communication with the moving body and receive, from the moving body, moving body information including first global estimated position information indicating global position information recognized as a geographic position of the moving body;
  a moving body extraction unit configured to extract local estimated position information indicating a position of the moving body within the detection target region from information acquired by the sensor unit;
  a moving body position calculation unit configured to calculate second global estimated position information estimated as the geographic position of the moving body based on the local estimated position information; and
  a sensor position calculation unit configured to perform calibration of third global estimated position information held as a geographic position of the sensor unit when a determination value obtained from the difference between the first global estimated position information and the second global estimated position information exceeds a preset threshold value and based on a result of calibration processing in which a difference between the first global estimated position information and the third global estimated position information is reduced.

An aspect of an infrastructure sensor system according to the present disclosure is an infrastructure sensor system including:

a sensor unit configured to detect a moving body within a detection target region;

a radio reception unit configured to perform communication with the moving body and receive, from the moving body, moving body information including first global estimated position information indicating global position information recognized as a geographic position of the moving body;

a moving body extraction unit configured to extract local estimated position information indicating a position of the moving body within the detection target region from information acquired by the sensor unit;

a moving body position calculation unit configured to calculate second global estimated position information estimated as the geographic position of the moving body based on the local estimated position information;

a sensor position calculation unit configured to perform calibration of third global estimated position information held as a geographic position of the sensor unit when a determination value obtained from the difference between the first global estimated position information and the second global estimated position information exceeds a preset threshold value and based on a result of calibration processing in which a difference between the first global estimated position information and the third global estimated position information is reduced; and a sensor position information holding unit configured to hold infrastructure sensor position information obtained by associating the third global estimated position information with device identification information specifying the moving body and transmit the infrastructure sensor position information held by the host system.

A computer readable medium storing an aspect of a position calibration program according to the present disclosure is a position calibration program implemented in a calculation unit of an infrastructure sensor system that includes:

a sensor unit configured to detect a moving body within a detection target region;

a radio reception unit configured to perform communication with the moving body and receive, from the moving body, moving body information including first global estimated position information indicating global position information recognized as a geographic position of the moving body; and a calculation unit configured to calculate a self-position of the sensor unit, in which local estimated position information indicating a position of the moving body within the detection target region is extracted from information acquired by the sensor unit, second global estimated position information estimated as the geographic position of the moving body is calculated based on the local estimated position information, and third global estimated position information held as a geographic position of the sensor unit is calibrated when a determination value obtained from the difference between the first global estimated position information and the second global estimated position information exceeds a preset threshold value and based on a result of calibration processing in which a difference between the first global estimated position information and the third global estimated position information is reduced.

A position calibration method for an infrastructure sensor apparatus, an infrastructure sensor apparatus, an infrastructure sensor system, and a position calibration program according to the present disclosure performs calibration of position information indicating a geographic position of an infrastructure sensor by referring to global position information obtained from a moving body that passes through a detection target range.

By using a position calibration method for an infrastructure sensor apparatus, an infrastructure sensor apparatus, an infrastructure sensor system, and a position calibration program according to the present disclosure, it is possible to easily perform calibration of the position information of the infrastructure sensor apparatus.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 7 is a flowchart of calibration processing of estimated position information in an infrastructure sensor apparatus according to the third embodiment.

DESCRIPTION OF EMBODIMENTS

Figure 1:
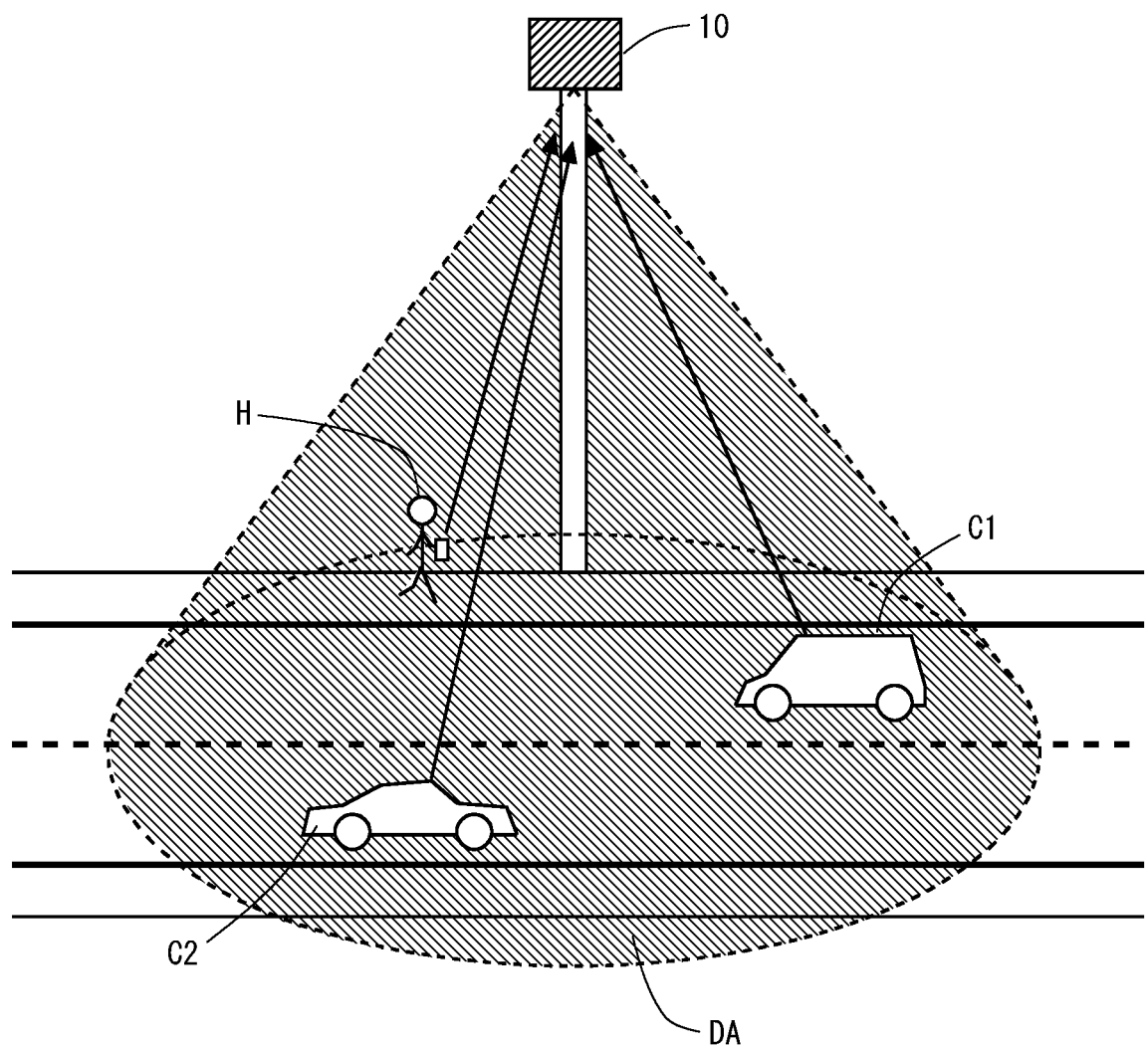
FIG. 1 is a structural diagram related to an infrastructure sensor apparatus of a traffic system according to a first embodiment.

For the sake of clarification, the following description and the attached drawings are shorted and simplified where appropriate. Further, each element shown in the drawings as a functional block that performs various processing can be configured of a CPU (Central Processing Unit), a memory, and other circuits in terms of hardware configuration and can be implemented by a program loaded in a memory in terms software configuration. Therefore, a skilled person can understand that these functional blocks can be implemented by a hardware configuration, a software configuration, or a combination thereof, and it is not to be limited to any one of them. In the drawings, the identical reference symbols denote identical structural elements and the redundant explanation thereof is omitted where appropriate.

Further, the aforementioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

First Embodiment

FIG. 1 shows a structural diagram related to an infrastructure sensor apparatus of a traffic system according to a first embodiment. The following description relates to a method for calibrating a position of an infrastructure sensor used in an infrastructure sensor system for grasping the traffic status in a traffic system.

As shown in FIG. 1, the infrastructure sensor system according to the first embodiment employs an infrastructure sensor apparatus 10. The infrastructure sensor apparatus 10 is installed on the side of a road. In order to use the infrastructure sensor in the system, the position information indicating the geographic position of the installation site of the senor needs to be accurate. But there is a problem that the infrastructure sensor apparatus 10 cannot be installed precisely at a position that is desired in view of the surrounding environment and the process of the installation work. Therefore, the infrastructure sensor apparatus 10 needs to register its correct position information in the system by performing calibration of the position of the installed sensor. A method of position calibration can be performed, for instance, by blocking off the roads and using calibration equipment. However, this method has a problem that the transportation infrastructure such as the traffic needs to be stopped, such as road blockade or the like. Hereinbelow, a method of performing calibration of the infrastructure sensor apparatus 10 without having to blocking off the roads or the like will be described.

As shown in FIG. 1, the infrastructure sensor apparatus 10 detects a moving body such as a person, a bicycle, a vehicle etc. present within a detection target range DA using an optical camera, a millimeter wave radar, a LiDAR (Laser Imaging Detection and Ranging), or the like. FIG. 1 shows an example in which a person H and vehicles C1 and C2 are present in the detection target range DA. The infrastructure sensor apparatus 10 transmits the position information of the moving body present within the detection target range DA and the feature information of the moving body to the host system.

Further, the infrastructure sensor apparatus 10 according to the first embodiment acquires estimated self-position information held by the moving body such as the person H and the vehicles C1 and C2 that are present within the detection target range DA by performing communication with the moving body. Examples of the estimated self-position information include position information acquired from a smartphone held by the person H and position information acquired from the GPS of a car navigation system included in each of the vehicles C1 and C2. The infrastructure sensor apparatus 10 has a self-position calibration function of calibrating the self-position information of the moving body based on the estimated self-position information of the moving body and the information on the moving body detected in the detection target range DA.

Figure 2:
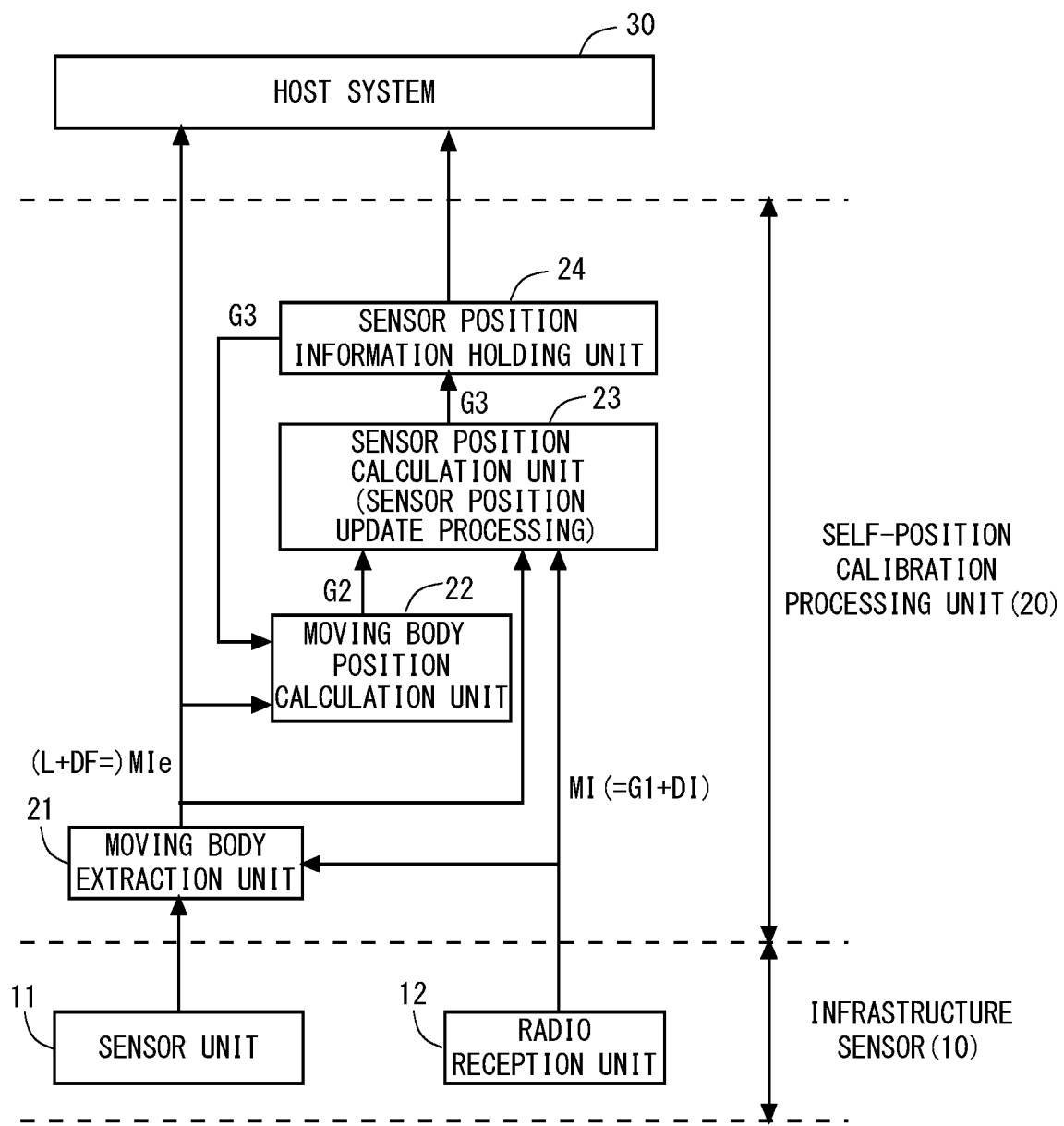
FIG. 2 is a block diagram of an infrastructure sensor system according to the first embodiment.

The infrastructure sensor apparatus 10 will be described in more detail. FIG. 2 is a block diagram of the infrastructure sensor system 1 according to the first embodiment. The infrastructure sensor apparatus 10 is used as a part of the infrastructure sensor system 1, and the infrastructure sensor system 1 includes a plurality of infrastructure sensor apparatuses 10. Further, as shown in FIG. 2, the infrastructure sensor system 1 includes the infrastructure sensor apparatus 10, a self-position calibration processing unit 20, and a host system 30. The infrastructure sensor apparatus 10 detects the moving body present in the detection target range DA and performs reception processing of the estimated self-position information from the moving body. The self-position calibration processing unit 20 performs calibration of the estimated self-position of the infrastructure sensor apparatus 10 based on the information acquired by the infrastructure sensor apparatus 10, and holds the estimated self-position that has been calibrated. The host system 30 performs processing related to various types of functions implemented by the infrastructure sensor system 1, and includes, for instance, a dynamic map that is used in managing the movement history of the moving body and predicting the motion of the moving body. The position of the infrastructure sensor apparatus 10 is mapped on a dynamic map. Note that the self-position calibration processing unit 20 may be located on the infrastructure sensor apparatus 10 side or on the host system 30 side.

The infrastructure sensor apparatus 10 includes at least a sensor unit 11 and a radio reception unit 12. Examples of the sensor unit 11 include an optical camera, a millimeter wave radar, a LiDAR (Laser Imaging Detection and Ranging), and the like. The sensor unit 11 acquires information for grasping the feature of the moving body within the detection target range and the distance between the moving body within the detection target range and the infrastructure sensor apparatus 10. The sensor unit 11 transmits the acquired information to a moving body extraction unit 21 of the self-position calibration processing unit 20. The radio reception unit 12 acquires moving body information MI including the self-position information held by each moving body and device identification information associated with the estimated self-position information using a radio signal such as cellular radio waves, wireless LAN, Bluetooth (registered trademark) etc. Note that in the following description, the estimated self-position information held by each moving body refers to the first global estimated position information indicating the geographic position of each moving body (e.g. moving body GPS information G1).

The self-position calibration processing unit 20 includes the moving body extraction unit 21, a moving body position calculation unit 22, a sensor position calculation unit 23, and a sensor position information holding unit 24. The moving body extraction unit 21 extracts the moving body in the detection target range DA by analyzing the information transmitted from the sensor unit 11 and generates moving body estimated information MIe related to the extracted moving body. The moving body estimation information MIe includes local estimated position information L indicating the position of the moving body within the detection target range DA and device feature information DF indicating the shape feature of the moving body. The moving body estimation information Mie is transmitted to the host system 30 and is referred to in performing calibration of the infrastructure sensor estimated position information G3 in the self-positon calibration processing unit 20.

The moving body position calculation unit 22 calculates the local estimated position information L based on the second global estimated position information (for instance, the moving body estimated position information G2). The moving body position calculation unit 22 according to the first embodiment calculates the moving body estimated position information G2 by adding the third global estimation position information (e.g., the infrastructure sensor estimated position information G3) held in the sensor position information holding unit 24 to the local estimated position information L.

The sensor position calculation unit 23 performs calibration of the infrastructure sensor estimated position information G3 held as the geographic position of the sensor unit 11 as the determination value obtained from the difference between the moving body GPS information G1 and the moving body estimated position information G2 exceeds the preset threshold value α. To be more specific, the sensor position calculation unit 23 performs calibration of the infrastructure sensor estimated position information G3 based on the result of the calibration processing in which the difference between the moving body GPS information G1 and the moving body estimated position information G2 is reduced. For instance, the moving body estimated position information G2 is expressed by infrastructure sensor estimated position information G3+local estimated position information L, and when the error between the moving body GPS information G1 and the moving body estimated position information G2 is assumed to be Δ, the relationship between the moving body GPS information G1 and the infrastructure sensor estimated position information G3 is expressed by G1=(G3+Δ)+L. Then, a value obtained by subtracting the local estimated position information L from the moving body GPS information G1 is adopted as the new infrastructure sensor estimated position information G3.

The sensor position information holding unit 24 holds the infrastructure sensor estimated position information G3 calibrated by the sensor position information holding unit 24 and outputs the held infrastructure sensor estimated position information G3 to the host system 30. Note that at the time of installation of the infrastructure sensor apparatus 10, the infrastructure sensor estimated position information G3 may be any given initial value (e.g. position information indicating the assumed geographical position for the installation).

Note that the moving body extraction unit 21, the moving body position calculation unit 22, the sensor position calculation unit 23, and the sensor position information holding unit 24 can be realized by, for instance, executing a position calibration program for realizing the processing blocks of these units in the processing unit that can implement the programs such as the CPU.

Figure 3:
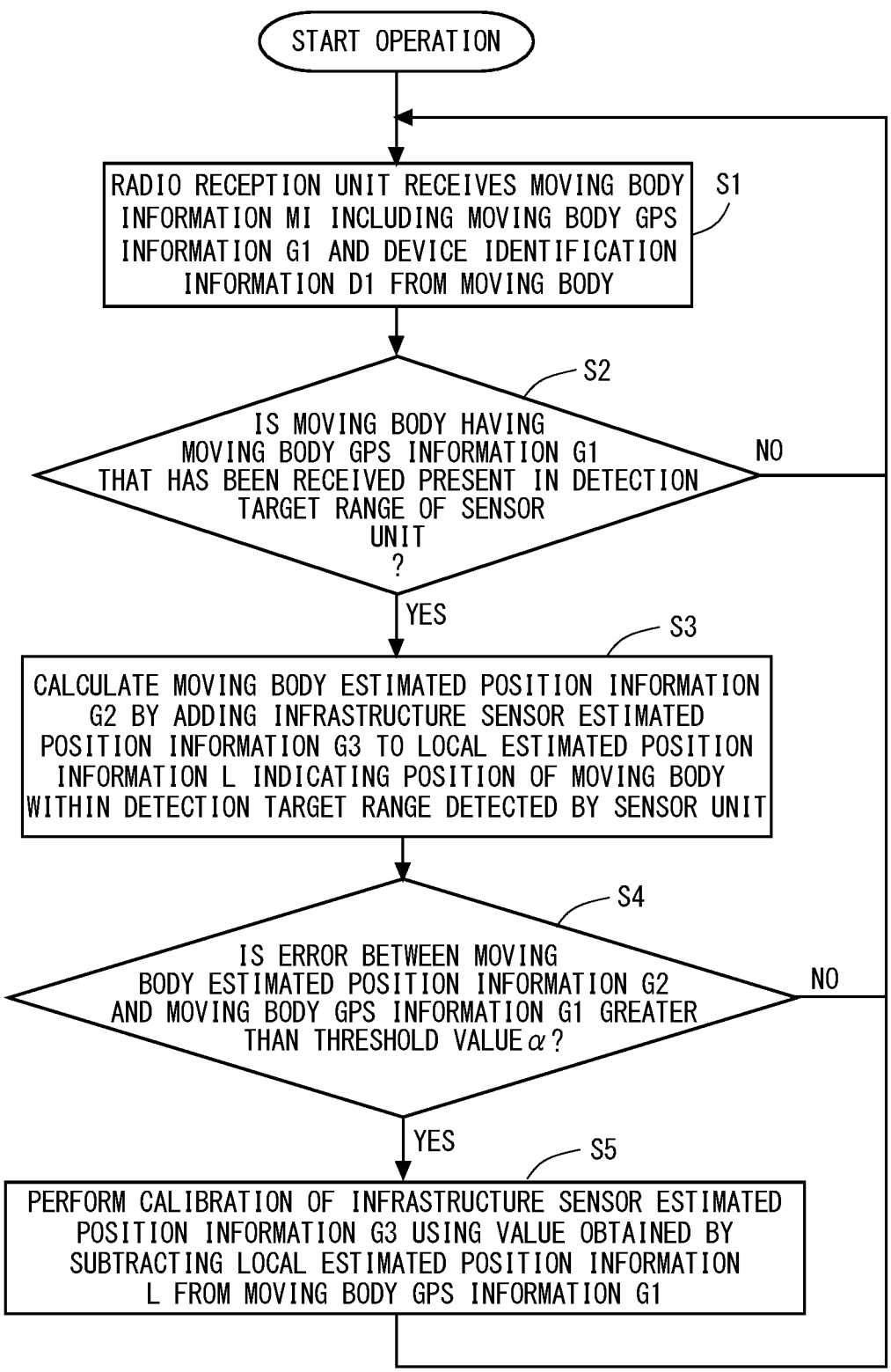
FIG. 3 is a flowchart of the calibration processing of estimated position information in the infrastructure sensor apparatus according to the first embodiment.

Next, the calibration processing of the sensor estimated position information in the infrastructure sensor apparatus 10 according to the first embodiment will be described. FIG. 3 shows a flowchart of the calibration processing of the estimated position information in the infrastructure sensor apparatus 10 according to the first embodiment. The flowchart shown in FIG. 3 describes only the processing related to the calibration of the estimated position information among the plurality of processing performed in the infrastructure sensor apparatus 10. Further, the processing described in the flowchart shown in FIG. 3 is performed in the self-position calibration processing unit 20 described with reference to FIG. 2, however in the following description, it will be described as the operation of the infrastructure sensor apparatus 10 including the self-position calibration processing unit 20. Note that in the infrastructure sensor system 1 according to the first embodiment, the position information of the planned installation site of the infrastructure sensor apparatus 10 is stored as the initial value of the infrastructure sensor estimated position information G3 in the sensor position information holding unit 24.

As shown in FIG. 3, in the infrastructure sensor apparatus 10 according to the first embodiment, the radio reception unit 12 receives the moving body information MI including the moving body GPS information G1 and the device identification information D1 from the moving body (Step S1). Then, the infrastructure sensor apparatus 10 confirms, in the moving body extraction unit 21, whether the moving body having the moving body GPS information G1 included in the moving body information MI received in Step S1 is present in the detection target range DA of the sensor unit 11 (Step S2). In this Step S2, the local estimated position information L indicating the position of the moving body in the detection target range DA and the device feature information DF indicating the feature of the moving body are extracted from the information which the moving body extraction unit 21 received from the sensor unit 11. Then, the moving body extraction unit 21 calculates the relevancy between the device feature information DF and the device identification information D1 associated with the moving body GPS identification information G1, and when it is determined that relevancy is high, determines that the moving body having the moving body GPS information G1 is present within the detection target range DA.

Then, in Step S2, when it is determined that the moving body having the moving body GPS information G1 is not present within the detection target range DA (NO in Step S2), the processing of the infrastructure sensor apparatus 10 returns to Step S1. On the other hand, when it is determined that the moving body having the moving body GPS information G1 is present within the detection target range DA (YES in Step S2), the moving body position calculation unit 22 calculates the moving body estimated position information G2 (Step S3). In Step S3, the moving body position calculation unit 22 calculates the moving body estimated position information G2 by adding the infrastructure sensor estimated position information G3 held by the sensor position information holding unit 24 to the local estimated position information L indicating the position of the moving body within the detection target range DA detected by the sensor unit 11.

Next, the sensor position calculation unit 23 determines whether or not to update the infrastructure sensor estimated position information G3 based on the moving body estimated position information G2 and the moving body GPS information G1 (Step S4 and Step S5). In Step S4, it is determined whether or not the error between the moving body estimated position information G2 and the moving body GPS information G1 is greater than the preset threshold value α. For instance, in Step S4, determination is made based on the difference between the absolute value of the error and the threshold value α. Then, in Step S4, when it is determined that the error is equal to or smaller than the threshold value α, the infrastructure sensor apparatus 10 does not perform update of the infrastructure sensor estimation information G3 held by the sensor position information holding unit 24 and the processing returns to that of Step S1. On the other hand, in Step S4, when it is determined that the error is greater than the threshold value α, the infrastructure sensor apparatus 10 performs calibration of the infrastructure sensor estimated position information G3 held by the sensor position information holding unit 24 by referring to the infrastructure sensor estimated position information G3 calculated from the moving body estimated position information G2 (Step S5). In this Step S5, the value obtained by subtracting the local estimated position information L from the moving body GPS information G1 is stored as the new moving body estimated position information G2 in the sensor position information holding unit 24.

As described above, by using the function of the self-position calibration processing unit 20 according to the first embodiment, the infrastructure sensor apparatus 10 can perform calibration of the infrastructure sensor estimated position information G3 indicating the geographic position of the infrastructure sensor apparatus 10 based on the moving body passing through the detection target range DA. That is, in the infrastructure sensor system 1 according to the first embodiment, it is possible to accurately grasp the installation position of the infrastructure sensor apparatus 10 without having to block off the roads or the like.

Second Embodiment

In a second embodiment, another embodiment of the infrastructure sensor system 1 according to the first embodiment will be described. Note that in the description of the second embodiment, the identical reference symbols denote the identical structural elements as those described in the first embodiment and the redundant explanation thereof is omitted.

Figure 4:
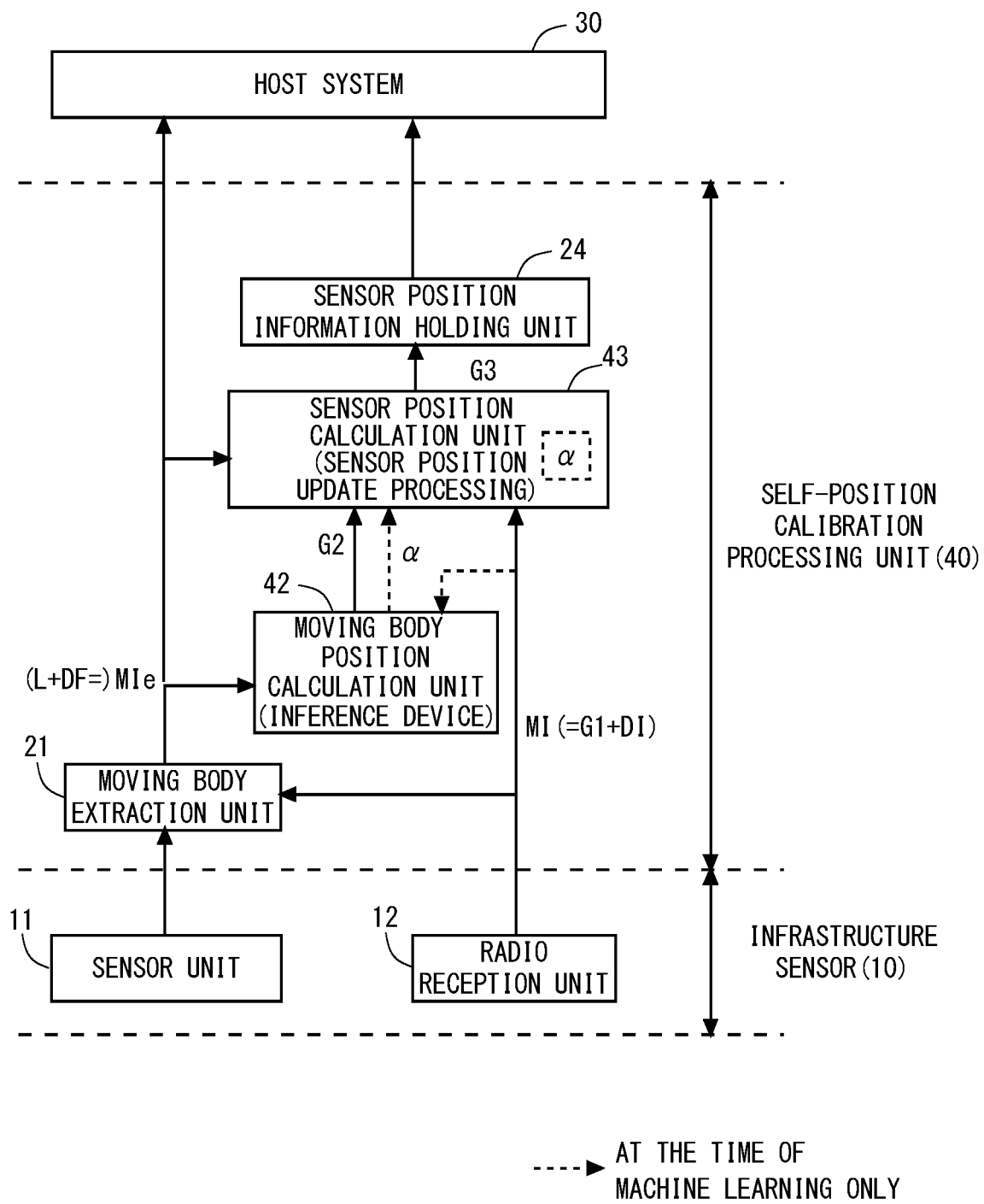
FIG. 4 is a block diagram of an infrastructure sensor system according to a second embodiment.

FIG. 4 is a block diagram of an infrastructure sensor system 2 according to the second embodiment. As shown in FIG. 4, the infrastructure sensor system 2 according to the second embodiment is obtained by replacing the self-position calibration processing unit 20 of the infrastructure sensor system 1 with a self-position calibration processing unit 40. The self-position calibration processing unit 40 is obtained by replacing the moving body position calculation unit 22 and the sensor position calculation unit 23 with a moving body position calculation unit 42 and a sensor position calculation unit 43, respectively.

The moving body position calculation unit 42 is, for instance, an inference device, and outputs an output value having a predetermined relationship with respect to the input value. More specifically, using the local estimated position information L included in the moving body estimation information MIe output from the moving body extraction unit 21 as the input data, the moving body position calculation unit 42 outputs the moving body estimated position information G2 indicating the global position information of the moving body detected in the detection target range DA estimated from the local estimated position information L.

The sensor position calculation unit 43 determines whether or not to calibrate the infrastructure sensor estimated position information G3 stored in the sensor position information holding unit 24 based on whether or not the error between the moving body estimated position information G2 and the moving body GPS information G1 is greater than the threshold value α. The sensor position calculation unit 43 differs from the sensor position calculation unit 23 in that the threshold value α is updated in accordance with the result of the machine learning performed for the moving body position calculation unit 42.

Figure 5:
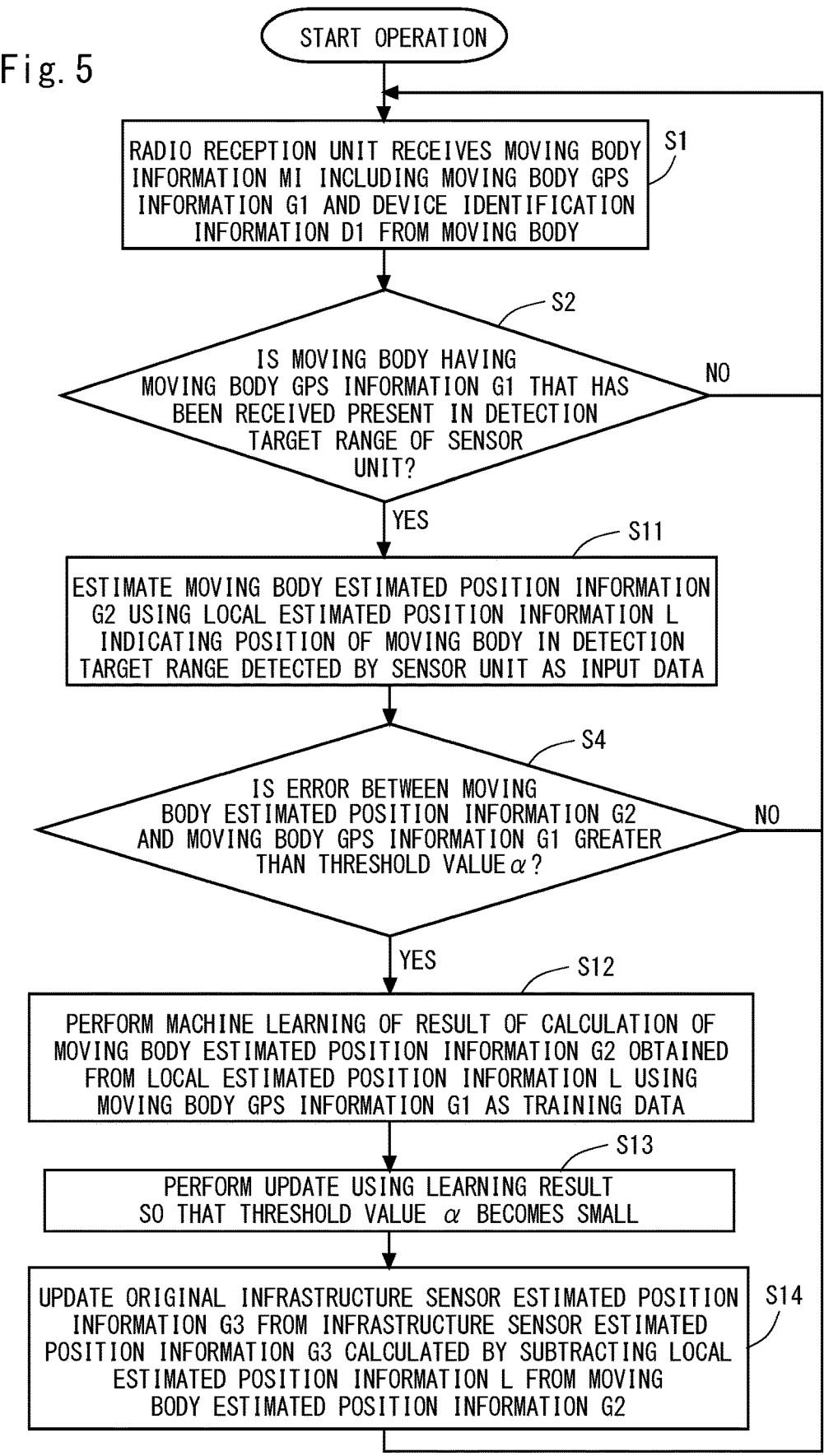
FIG. 5 is a flowchart of calibration processing of estimated position information in an infrastructure sensor apparatus according to the second embodiment.

Next, the calibration processing of the sensor estimated position information in the infrastructure sensor system 2 according to the second embodiment will be described. FIG. 5 shows a flowchart of calibration processing of estimated position information in an infrastructure sensor apparatus 10 according to the second embodiment. The flowchart shown in FIG. 5 describes only the processing related to the calibration of the estimated position information among the plurality of processing performed in the infrastructure sensor apparatus 10. Further, the processing described in the flowchart shown in FIG. 5 is performed in the self-position calibration processing unit 40 described with reference to FIG. 4, however in the following description, it will be described as the operation of the infrastructure sensor apparatus 10 including the self-position calibration processing unit 40. Note that in the infrastructure sensor system 2 according to the second embodiment, the position information of the planned installation site of the infrastructure sensor apparatus 10 is stored as the initial value of the infrastructure sensor estimated position information G3 in the sensor position information holding unit 24 and any given value is set as the threshold value α.

As shown in FIG. 5, in the configuration processing of the sensor estimated position information in the infrastructure sensor system 2 according to the second embodiment, Step S3 shown in FIG. 3 is replaced by Step S11, and Step S5 shown in FIG. 3 is replaced by Step S12 to Step S14.

In Step S11, the moving body position calculation unit 42 estimates the moving body estimated position information G2 using the local estimated position information L output from the sensor unit 11 as indicating the position of the moving body in the detection target range DA as the input data. Then, in Step S4, when it is determined that the error between the moving body estimated position information G2 and the moving body GPS information G1 is greater than the threshold value α, the processing of Step S12 to Step S14 is performed.

In Step S12, machine learning is performed to the moving body position calculation unit 42 using the moving body GPS information G1 as the training data and the local estimated position information L as the input data. By this machine learning, the moving body estimated position information G2 that is calculated when the local estimated position information L is input to the moving body position calculation unit 42 varies. Note that in this machine learning, the learning is finished on the condition that the error between the moving body GPS information G1 and the moving body estimated position information G2 becomes smaller than the preset threshold value α.

Next, in Step S13, update of the threshold value α is performed by referring to the result of the machine learning performed in Step S12 so that the threshold value α becomes small. Then, in Step S14, the sensor position calculation unit 43 updates the original infrastructure sensor estimated position information G3 from the infrastructure sensor estimated position information G3 calculated by subtracting the local estimated position information L from the moving body estimated position information G2 that has been learned in Step S12.

As described above, in the infrastructure sensor system 2 according to the second embodiment, the moving body estimated position information G2 is calculated using the inference device, and the machine learning is performed on the inference device to thereby make the threshold value α smaller. Accordingly, in the infrastructure sensor system 2 according to the second embodiment, the accuracy of the infrastructure sensor estimated position information G3 calculated from the moving body estimated position information G2 can be enhanced compared to the infrastructure sensor system 1 according to the first embodiment.

Further, in the infrastructure sensor system 2 according to the second embodiment, it is possible to enhance the accuracy of the position of the moving body in the infrastructure sensor estimated position information G3 at a high speed even when the accuracy of the infrastructure sensor estimated position information G3 given as the initial value is not high. This is owing to the threshold value α being updated by performing machine learning.

Third Embodiment

In a third embodiment, another embodiment of the infrastructure sensor system 1 according to the first embodiment will be described. Note that in the description of the third embodiment, the identical reference symbols denote the identical structural elements as those described in the first embodiment and the redundant explanation thereof is omitted.

Figure 6:
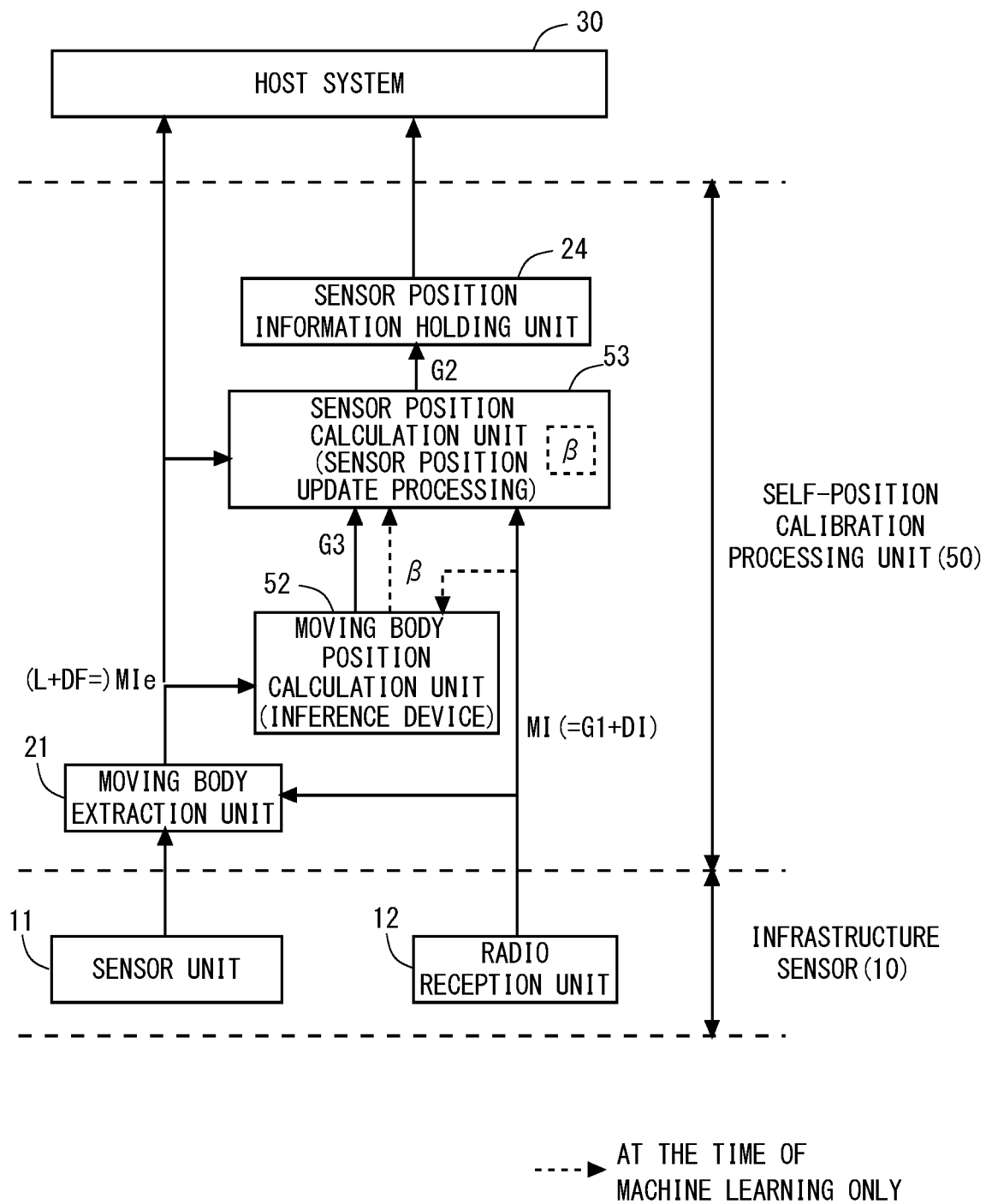
FIG. 6 is a block diagram of infrastructure sensor system according to a third embodiment.

FIG. 6 is a block diagram of an infrastructure sensor system 3 according to the third embodiment. As shown in FIG. 6, the infrastructure sensor system 3 according to the third embodiment is obtained by replacing the self-position calibration processing unit 20 of the infrastructure sensor system 1 with a self-position calibration processing unit 50. The self-position calibration processing unit 50 is obtained by replacing the moving body position calculation unit 22 and the sensor position calculation unit 23 with a moving body position calculation unit 52 and a sensor position calculation unit 53, respectively.

The moving body position calculation unit 52 is, for instance, an inference device, and outputs an output value having a predetermined relationship with respect to the input value. More specifically, using the local estimated position information L included in the moving body estimation information MIe output from the moving body extraction unit 21 as the input data, the moving body position calculation unit 52 outputs the moving body estimated position information G2 indicating the global position information of the moving body detected in the detection target range DA estimated from the local estimated position information L.

The sensor position calculation unit 53 determines whether or not to calibrate the infrastructure sensor estimated position information G3 stored in the sensor position information holding unit 24 based on whether or not the degree of reliability of the moving body estimated position information G2 with respect to the moving body GPS information G1 is greater than the threshold value β.

Next, the calibration processing of the sensor estimated position information in the infrastructure sensor system 3 according to the third embodiment will be described. FIG. 7 shows a flowchart of the calibration processing of the estimated position information in the infrastructure sensor apparatus 10 according to the third embodiment. The flowchart shown in FIG. 7 describes only the processing related to the calibration of the estimated position information among the plurality of processing performed in the infrastructure sensor apparatus 10. Further, the processing described in the flowchart shown in FIG. 7 is performed in the self-position calibration processing unit 50 described with reference to FIG. 6, however in the following description, it will be described as the operation of the infrastructure sensor apparatus 10 including the self-position calibration processing unit 50. Note that in the infrastructure sensor system 3 according to the third embodiment, the position information of the planned installation site of the infrastructure sensor apparatus 10 is stored as the initial value of the infrastructure sensor estimated position information G3 in the sensor position information holding unit 24 and any given value is set as the threshold value β.

As shown in FIG. 7, in the configuration processing of the sensor estimated position information in the infrastructure sensor system 2 according to the second embodiment, Step S3 and the subsequent steps shown in FIG. 3 are replaced by Step S21 and Step S25 shown in FIG. 3.

In Step S21, the moving body position calculation unit 52 estimates the moving body estimated position information G2 using the local estimated position information L output from the sensor unit 11 as indicating the position of the moving body in the detection target range DA as the input data. Then, in Step S22, the reliability of the moving body estimated position information G2 with respect to the moving body GPS information G1 is calculated by the moving body position calculation unit 52 and when the calculated reliability is determined to be lower than the threshold value β, the processing of Step S23 to Step S25 is performed.

In Step S23, machine learning is performed to the moving body position calculation unit 52 using the moving body GPS information G1 as the training data and the local estimated position information L as the input data. By this machine learning, the moving body estimated position information G2 that is calculated when the local estimated position information L is input to the moving body position calculation unit 52 varies. Note that in this machine learning, the learning is finished on the condition that the degree of reliability of the moving body estimated position information G2 with respect to the moving body GPS information G1 becomes greater than the original threshold value β.

Next, in Step S24, the sensor position calculation unit 53 updates the original infrastructure sensor estimated position information G3 from the infrastructure sensor estimated position information G3 calculated by subtracting the local estimated position information L from the moving body estimated position information G2 that has been learned in Step S23. Then, in Step S25, update of the threshold value β is performed by referring to the result of the machine learning performed in Step S23 so that the threshold value β becomes large.

As described above, in the infrastructure sensor system 3 according to the third embodiment, the moving body estimated position information G2 is calculated using the inference device, and the machine learning is performed on the inference device to thereby make the threshold value β larger. Accordingly, in the infrastructure sensor system 3 according to the third embodiment, the accuracy of the infrastructure sensor estimated position information G3 calculated from the moving body estimated position information G2 can be enhanced compared to the infrastructure sensor system 1 according to the first embodiment.

Further, in the infrastructure sensor system 3 according to the third embodiment, it is possible to enhance the accuracy of the position of the moving body in the infrastructure sensor estimated position information G3 at a high speed even then the accuracy of the infrastructure sensor estimated position information G3 given as the initial value is not high. This is owing to the threshold value β being updated by performing machine learning.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A position calibration method for an infrastructure sensor apparatus, the method comprising:
   detecting a moving body within a detection target region by an infrastructure sensor;
   performing communication with the moving body and receiving, from the moving body, moving body information including first global estimated position information indicating global position information recognized as a geographic position of the moving body;
   extracting local estimated position information indicating a position of the moving body within the detection target region from information acquired by the infrastructure sensor;
   calculating second global estimated position information estimated as the geographic position of the moving body based on the local estimated position information by an inference device configured to use the local estimated position information as input data thereof;
   performing calibration of third global estimated position information held as a geographic position of the infrastructure sensor using a value obtained by subtracting the local estimated position information from the second global estimated position information that has been learned in machine learning when a determination value exceeds a preset threshold value and based on a result of calibration processing in which a difference between the first global estimated position information and the third global estimated position information is reduced, wherein the determination value is a difference in the position of the moving body between the first global estimated position information and the second global estimated position information, and the machine learning is performed on the inference device configured to calculate the second global estimated position information calculated from the local estimated position information using the first global estimated position information as training data when the determination value exceeds the threshold value; and
   updating the threshold value based on a result of the machine learning so that the threshold value becomes small.

2. The position calibration method for the infrastructure sensor apparatus according to claim 1, wherein the infrastructure sensor includes at least one of an optical camera for capturing an image within the detection target region, a millimeter wave radar for acquiring position information of the moving body using a radio signal, and a LiDAR for acquiring information including image information and distance information.

3. The position calibration method for the infrastructure sensor apparatus according to claim 1, wherein
   the moving body information includes device identification information specifying the moving body, and
   the local estimated position information is calculated for the moving body whose type and device identification information match with those specified when calculating the local estimated position information.

4. The position calibration method for the infrastructure sensor apparatus according to claim 1, wherein the third global estimated position information and device identification information specifying the moving body are associated with each other and transmitted to a host system.

5. A position calibration method for an infrastructure sensor apparatus, the method comprising:
   detecting a moving body within a detection target region by an infrastructure sensor;
   performing communication with the moving body and receiving, from the moving body, moving body information including first global estimated position information indicating global position information recognized as a geographic position of the moving body;
   extracting local estimated position information indicating a position of the moving body within the detection target region from information acquired by the infrastructure sensor;
   calculating second global estimated position information estimated as the geographic position of the moving body based on the local estimated position information by an inference device configured to use the local estimated position information as input data thereof;
   machine learning the second global estimated position information calculated from the local estimated position information using the first global estimated position information as training data on the inference device when the degree of reliability of a determination value is equal to or lower than the threshold value, wherein the determination value is a degree of reliability of the second global estimated position information with respect to the first global estimated position information;
   performing calibration of third global estimated position information held as a geographic position of the infrastructure sensor, using a value obtained by subtracting the local estimated position information from the second global estimated position information that has been learned in machine learning after the machine learning, when the determination value exceeds a preset threshold value and based on a result of calibration processing in which a difference between the first global estimated position information and the third global estimated position information is reduced;
   maintaining the third global estimated position information when the degree of reliability of the determination value is higher than the threshold value; and
   updating the threshold value based on a result of the machine learning so that the threshold value becomes small.

* * * * *